US006192382B1

(12) United States Patent
Lafer et al.

(10) Patent No.: US 6,192,382 B1
(45) Date of Patent: Feb. 20, 2001

(54) METHOD AND SYSTEM FOR WEB SITE CONSTRUCTION USING HTML FRAGMENT CACHING

(75) Inventors: John P. Lafer; John E. Faust; Curtis Riggs; Glendon Ross Diener, all of Boulder, CO (US)

(73) Assignee: MediaOne Group, Inc., Englewood, CO (US)

( * ) Notice: Under 35 U.S.C. 154(b), the term of this patent shall be extended for 0 days.

(21) Appl. No.: 08/936,312

(22) Filed: Sep. 24, 1997

(51) Int. Cl.[7] ...................................................... G06F 17/30
(52) U.S. Cl. ............................................ 707/513; 707/501
(58) Field of Search .................................... 707/501, 513, 707/500, 514, 510, 10

(56) References Cited

U.S. PATENT DOCUMENTS

| | | | |
|---|---|---|---|
| 5,572,643 | * 11/1996 | Judson | 709/218 |
| 5,649,186 | * 7/1997 | Ferguson | 707/10 |
| 5,799,298 | * 8/1998 | Bingham et al. | 707/1 |
| 5,870,737 | * 2/1999 | Dockter et al. | 707/4 |
| 5,878,218 | * 3/1999 | Maddalozzo, Jr. et al. | 709/213 |
| 5,894,554 | * 4/1999 | Lowery et al. | 709/203 |
| 5,897,622 | * 4/1999 | Blinn et al. | 705/26 |
| 5,950,200 | * 9/1999 | Sudai et al. | 707/9 |
| 5,961,603 | * 10/1999 | Kunkel et al. | 709/229 |
| 5,973,972 | * 8/1998 | Shane | 709/219 |
| 5,983,227 | * 11/1999 | Nazem et al. | 707/10 |
| 5,987,480 | * 11/1999 | Donohue et al. | 707/501 |
| 5,999,912 | * 12/1999 | Wodarz et al. | 707/14 |
| 6,009,441 | * 12/1999 | Mathieu et al. | 707/516 |
| 6,012,074 | * 1/2000 | Lucas et al. | 707/531 |
| 6,029,182 | * 2/2000 | Nehab et al. | 707/523 |
| 6,038,601 | * 3/2000 | Lambert et al. | 709/226 |
| 6,076,166 | * 6/2000 | Moshfeghi et al. | 713/201 |

OTHER PUBLICATIONS

Maher, R. C., Simple but useful tools for interactive WWW development, Nov. 6–9, 1996, Proceedings of Frontiers in Education Conference 26th annual conference, p. 1035–1038, vol. 3.*

O'Krafka et al, An empirical evaluation of two memory–efficient directory methods, May 28–31, 1990, Computer Architecture, Proceedings, 17th Annual International Symposium on, p. 138–147.*

Peir et al, Improving cache performance with balance tag and data paths, Oct. 1–5, 1996, 7th International Conference on Architectural Support for Programming Languages and Operating Systems, ACM, vol. 31, No. 9, p. 268–78.*

Wexler, J., Relay races to cache pages, Sep. 2, 1996, Network World, p. 17.*

* cited by examiner

Primary Examiner—Stephen S. Hong
Assistant Examiner—Cesar B. Paula
(74) Attorney, Agent, or Firm—Brooks & Kushman P.C.

(57) ABSTRACT

A method and system for web site construction using HTML fragment caching includes embedding particular tags in a stored HTML page, and when a request for distribution of the HTML page is received from a user, replacing each tag with content information in the form of HTML fragments previously created based on user preference information. The HTML fragments are stored in a tag cache, thereby decreasing the amount of time necessary to construct and distribute customized Web pages. Creation of the HTML fragments can be based on topic information supplied by the user to form a user customizable key through which content is retrieved from the tag cache.

11 Claims, 2 Drawing Sheets

METHOD AND SYSTEM FOR WEB SITE CONSTRUCTION USING HTML FRAGMENT CACHING

TECHNICAL FIELD

The present invention relates to Web site or page construction and distribution via an Internet server, and more particularly to an arrangement for allowing user personalization of a Web site.

BACKGROUND ART

Generally, the dramatic growth in use of the Internet has likewise seen a dramatic growth in the amount of information which can be distributed from a Web server to a user. As such, a key factor in optimizing distribution efficiency is reducing the amount of time required by a server to construct or generate a particular Web page requested by a user.

In the past, this factor has acted as a barrier to allowing users the ability to personalize or tailor their individual Web pages with specialized information because the need for the server to constantly retrieve the specialized information every time a page was generated significantly increased server response time. Increased response time adds cost to the operation of the system, and also taxes limited system resources.

While caching has been utilized in an attempt to decrease the server response time, such caching arrangements do not improve efficiency of distributing personalized or customized Web pages. More specifically, both caching of the information stored in a database accessed by a server based on classification or categorization of content, i.e., "object caching," and caching of previously constructed pages which are likely to be distributed again have been employed to improve distribution efficiency.

In both instances, any specialized information added by way of page personalization would still need to be retrieved from the database each time the page were distributed to the user. Thus, a need still exists for improving distribution efficiency and server response time so that a user can have the option of personalizing individual Web pages.

DISCLOSURE OF THE INVENTION

Accordingly, it is an object of the present invention to provide an improved method and system for Web page construction and distribution which allows a user the ability to personalize individual pages.

It is another object of the present invention to provide a method and system for Web page construction and distribution which includes a tag cache located in a server, and associated tags which can be selectively embedded into stored pages to allow personalization of individual pages.

In accordance with these and other objects, the present invention provides a method and system for specifying fragments of HTML text using specialized tags, holding these fragments in a tag cache, and rapidly rendering personalized HTML pages using the cached fragments.

In accordance with one aspect of the present invention, a method for selectively distributing information including personalized Web pages on a network such as the Internet is characterized by the steps of storing in a tag cache at least one HTML fragment derived from information stored in a database as determined from a user's input preference information, and associating the at least one HTML fragment stored in the tag cache with a particular tag to be selectively embedded in an HTML document or file stored in a server. Each tag is subsequently replaced with the associated HTML fragment(s) during construction of a requested HTML file. In the preferred embodiment, topic information supplied by the user is used to form a key through which the content is retrieved from the tag cache. The method also includes creating tag cache entries as needed from data held in an object cache or a database.

More specifically, the step of retrieving content from the tag cache can be performed by forming a hash key from a current user's topic information. Topic information is composed of data specifying categories and locations of interest to a particular user. The topic information can be entered as preferences for a registered user, can be obtained from selections made by a user during the session, or both.

In accordance with another aspect of the present invention, a system for constructing and selectively distributing Web pages comprises a server processor for translating user requests into HTML page requests, and a tag cache containing a plurality of predetermined HTML fragments stored therein. A first storage device is provided for storing a plurality of HTML files, one or more of which are selectively augmented with a plurality of particular tags each associated with one or more of the predetermined HTML fragments. A second storage device is provided for storing user preference information represented as topics. A mapping logic processor communicates with the first storage device, second storage device and the tag cache so as to construct an HTML file by substituting one or more predetermined HTML fragments for each particular tag embedded in a requested HTML file based on the stored user preference information. The server processor is further operative to distribute the constructed HTML files to the user.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
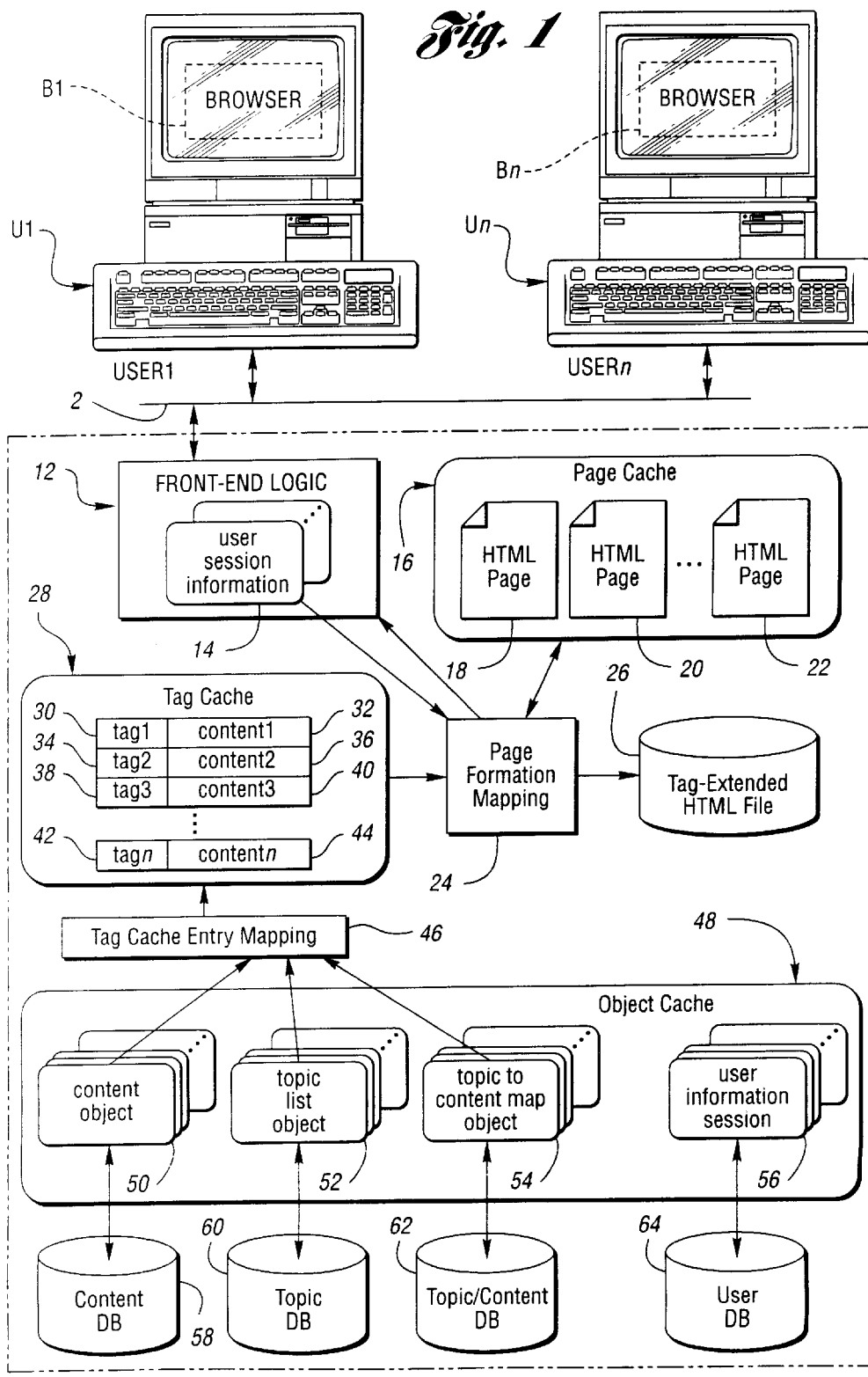
FIG. 1 is a block diagram showing the major components of a web server employing an HTML fragment cache according to the present invention.

Referring now to FIG. 1, an implementation of a server according to the present invention is shown. A plurality of users, represented by references U1 through Un, seek to obtain information from a server, represented by reference 10. The users are connected to the server via a communication medium as shown in reference 2. In the preferred embodiment, the communication medium is the Internet, but such an arrangement is not to be construed as limiting. In addition, the preferred embodiment presents information to the user in the form of HTML pages or files. However, this too is not to be construed as limiting since the present invention can be used with any information delivery format capable of supporting embedded tags. Each user may view the HTML pages using a conventional Internet browser as represented by B1 through Bn.

Considering the server 10 in detail, front-end logic is responsible for interfacing with users U1 to Un through the communication medium 2. As represented by block 12, the front-end logic can be implemented as a standard web server. The front-end logic services the user by returning requested information in the form of HTML pages. The front-end logic generally operates to collect session information as shown in block 14. This information can be obtained, for example, through the use of HTML forms as is commonly done with web pages.

A page formation mapping process, as shown in reference 24, provides construction of the HTML pages in accordance with the present invention. A page cache, represented by block 16, reduces latency by holding HTML pages that are likely to be used again in the future, as represented by references 18, 20 and 22. Techniques for the caching of pages is well known.

A storage medium or device, shown as block 26, is used to hold tag-extended HTML files. In accordance with the present invention, the tags form an extension to the HTML language that allow for dynamic substitution of content for tag values based on stored user preferences and session information. The storage device may be implemented as a directory system or as a database.

A tag cache as shown in reference 28 contains HTML fragments that are substituted for tag values. The tag cache is composed of a plurality of tag-content pairs as shown in blocks 30 and 32, 34 and 36, 38 and 40, and 42 and 44. In the preferred embodiment, the tag cache is implemented using a persistent, e.g., disk-based, hash table. However, as will be appreciated by one of ordinary skill in the art, other software or hardware methods may be used to implement the tag cache.

A tag cache entry mapping, as shown in block 46, is used to map HTML fragments into the tag. Depending on the type of tag into which the HTML data will be substituted, the mapping may require content data, topic list data, or topic-to-content mapping data.

More specifically, HTML fragments mapped into the tag cache are fetched from an object cache referenced as block 48. The object cache holds content objects 50, topic list objects 52, and topic-to-content map objects 54 as well as user information objects shown as block 56. The data for these objects are maintained in respective databases 58, 60, 62 and 64.

Figure 2:
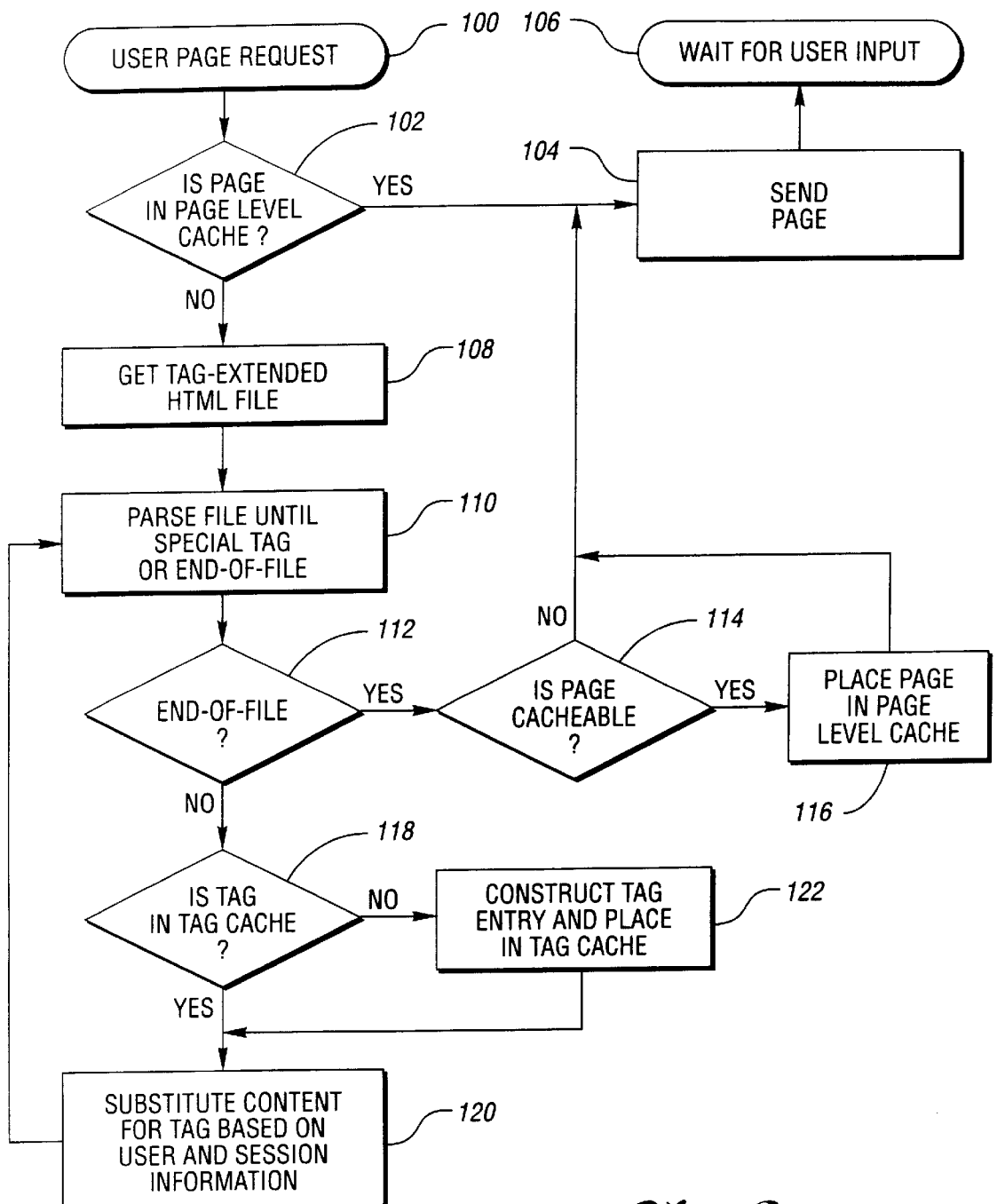
FIG. 2 is a flow diagram representing operation of a system or method according to the present invention.

Referring now to FIG. 2, a flow chart illustrates overall operation for providing selective distribution of information and construction of customizable pages in accordance with the present invention. The illustrated steps are not necessarily sequential operations, and may be implemented using appropriate software, hardware, or a combination of both. The sequential flow of the steps has been shown for ease of illustration.

Block 100 of the flow diagram represents a user request for information in the form of an HTML page. As is well known, this can be a Uniform Resource Locator (URL) address for Internet servers. Block 102 checks to see if the page is cached. A page may be cached if it has been previously requested by some user or if the system anticipates that it may be accessed by a user. If the page is cached, the page is sent to the user as is shown in Block 104. Block 106 indicates that the system may then wait for additional user requests.

If the page is not in the cache, the page must be constructed or generated. The generation process begins by obtaining the tag-extended HTML file as shown in block 108. Block 110 shows that the tag-extended file is then parsed until either a particular tag or the end-of-file is encountered. If the end-of-file is encountered, as is shown in block 112, a check is made to determine if the page should be cached as in block 114. If so, block 116 indicates that the page is placed in the page cache. This process can be implemented using any known algorithm or technique available for managing a page cache. Flow then passes to block 104 where the page is sent to the user as previously described.

If, while parsing the file and before the end-of-file is reached, a particular tag is encountered, the tag is replaced with one or more HTML fragments associated with the tag. More specifically, a tag in accordance with the present invention does not constitute a part of the standard HTML tag library. The tag syntax chosen for the preferred embodiment uses a special begin symbol and end symbol to mark the particular tag as follows:

| | |
|---|---|
| <!- - CW> | begin symbol |
| type=typename | tag type attribute |
| ... | additional tag attributes |
| <CW - -> | end symbol |

Other symbols could be used to signify a tagged region.

The content of a particular tag includes a set of tag attributes. One tag attribute determines the tag type. Other tag attributes have text values that can contain substitution tokens. These tokens are replaced by values depending on the tag type. Possible token replacements include but are not limited to content data from a database, URLs for predefined forms, user session information, and URL attributes and form fields.

If a particular tag is encountered prior to the end-of-file, the tag cache is checked as is shown in block 118. If the tag is already associated with contents in the tag cache, the contents are substituted for the tag as in block 120. A tag key is based on the topic. The topic is a collection of orthogonal classification variables. For example, the topic variables can be category and location, such as sports, dining, and theater for categories, and Denver, Seattle and Detroit for locations. Classification variables may also be hierarchical, such as by dividing the location by continent, then by country, then by region, then by state, then by metropolitan areas. The numbers and types of classification variables and hierarchical levels can be varied to meet the requirements of the system.

If the tag does not exist in the tag cache, a tag-content pair is constructed from information in the object cache or databases as shown in block 122. The use of the object cache shortens database access latency. The content associated with the current topic is matched with a key formed from information including relevant topic information, content type, and a reference to the HTML page. This page reference may be the base file name or may include all or part of the URL address.

Thus, the present invention provides a system and method for selectively constructing and distributing personalized HTML pages by storing selected fragments of HTML text in a tag cache, and rapidly rendering the personalized HTML pages via special tags embedded in extended HTML files which allow identification and retrieval of the desired fragments.

Further, while a preferred embodiment of the present invention has been described, it will be appreciated that actual implementation of the system architecture is susceptible to modification. For example, the logic blocks as described in conjunction with FIG. 1 can be implemented in hardware, software or a combination thereof, and that the blocks could be combined into larger logical units or further subdivided to conveniently implement the system.

Thus, while the best mode for carrying out the invention has been described in detail, those familiar with the art to which this invention relates will recognize various alternative designs and embodiments for practicing the invention as defined by the following claims.

What is claimed is:

1. A method for selectively distributing information including personalized Web pages on the Internet comprising the steps of:

generating a plurality of HTML files based on information stored in a database;

generating at least one HTML fragment based on information stored in the database having a predetermined content;

storing each generated HTML fragment in a tag cache;

associating a particular tag with each HTML fragment stored within the tag cache;

expanding the generated HTML files by selectively embedding at least one of the tags into at least one of the generated HTML files, wherein the tags and HTML files are selected for embedding based on a predetermined user preference to allow user personalization of the HTML file; and storing the expanded HTML files in a storage device, wherein when a request is received from a user for distribution of an HTML file, the method further comprises constructing an output HTML file by retrieving the corresponding expanded HTML file from the storage device, locating any embedded tags to retrieve the associated HTML fragment from the tag cache for replacement of the located tags, and distributing the constructed output HTML file to the user.

2. The method of claim 1 further comprising the steps of determining whether an HTML fragment associated with a particular tag is currently stored in the tag cache, and if not, regenerating and restoring the fragment in the tag cache.

3. The method of claim 1 further comprising the steps of selectively storing output HTML files in a page cache.

4. The method of claim 3 further comprising the step of determining whether a requested HTML file has been stored as a prior output file in the page cache before retrieving the corresponding expanded HTML file from the storage device.

5. The method of claim 1 further comprising the step of mapping the HTML fragments stored in the tag cache based on at least one topic of information contained in the fragment.

6. The method of claim 1 further comprising the step of generating topic information formed from data specifying categories and locations of information content of interest to a particular user, and wherein the step of retrieving fragments from the tag cache comprises forming a key from a current user's topic information.

7. A system for constructing and selectively distributing Web pages in response to a user request received through a network connection comprises:

a server processor for translating a received user request into an HTML page request;

a tag cache connected to said server processor having a plurality of predetermined HTML fragments stored therein;

a first storage device connected to said server processor for storing a plurality of HTML files, one or more of which are selectively augmented with a plurality of particular tags each identifying one or more of said plurality of predetermined HTML fragments;

a second storage device connected to said server processor for storing user preference information relating to at least one topic of information content, wherein the user preference information controls personalization of a desired HTML file; and a mapping logic processor in communication with said first storage device, said second storage device, and said tag cache, and arranged to generate the augmented HTML files by embedding a tag based on the user preference information; retrieve a requested HTML file from said first storage device; and to construct an output HTML file by substituting the identified HTML fragments for each particular tag embedded in the retrieved HTML file, wherein said server processor distributes the constructed output HTML file to the user.

8. The system of claim 7 further comprising a page cache, wherein said mapping logic processor selectively stores constructed output files in said page cache.

9. The system of claim 8 wherein said mapping logic processor is arranged to determine whether a requested HTML file has been stored in page cache before constructing a corresponding output file.

10. The system of claim 7 wherein said mapping logic processor is arranged to determine whether an HTML fragment associated with a particular tag is currently stored in said tag cache, and if not, regenerating and restoring the fragment in said tag cache.

11. The system of claim 7 further comprising a tag cache mapping processor for mapping each of said plurality of HTML fragments stored in said tag cache based on at least one topic of information contained in the HTML fragment.

* * * * *

UNITED STATES PATENT AND TRADEMARK OFFICE
CERTIFICATE OF CORRECTION

PATENT NO. : 6,192,382 B1
DATED : February 20, 2001
INVENTOR(S) : John P. Lafer, et al.

It is certified that error appears in the above-identified patent and that said Letters Patent is hereby corrected as shown below:

<u>Title page, Column 1,</u>
Lines 1-2, item [54], the title should read -- BUILDING CUSTOMIZED WEB PAGES USING HTML FRAGMENTS STORED IN A TAG CACHE --.

Signed and Sealed this

Twenty-first Day of August, 2001

Attest:

*Nicholas P. Godici*

NICHOLAS P. GODICI
*Attesting Officer*     *Acting Director of the United States Patent and Trademark Office*